(12) United States Patent
Bell et al.

(10) Patent No.: US 6,491,736 B1
(45) Date of Patent: Dec. 10, 2002

(54) POLYHYDRIC ALCOHOL ANTI-DUST AGENT FOR INORGANIC MATERIALS

(75) Inventors: Fred S. Bell, Billings, MT (US); Donald G. Zink, Houston, TX (US)

(73) Assignee: Montana Sulphur & Chemical Company, Billings, MT (US)

( * ) Notice: Subject to any disclaimer, the term of this patent is extended or adjusted under 35 U.S.C. 154(b) by 45 days.

(21) Appl. No.: 09/681,562

(22) Filed: Apr. 30, 2001

(51) Int. Cl.$^7$ .................................................. C05D 9/00
(52) U.S. Cl. .......................................... 71/64.07; 71/31
(58) Field of Search .................................. 71/64.07, 31

(56) References Cited

U.S. PATENT DOCUMENTS

| | | | |
|---|---|---|---|
| 1,924,180 A | 8/1933 | Cole | 44/6 |
| 1,988,999 A | 1/1935 | Cunningham | 44/6 |
| 2,436,146 A | 2/1948 | Kleinicke | 252/88 |
| 2,744,823 A * | 5/1956 | Diamond | 99/2 |
| 3,195,999 A | 7/1965 | Chance | 71/28 |
| 3,264,084 A | 8/1966 | Karcher | 71/24 |
| 3,353,949 A | 11/1967 | Nau | 71/64 |
| 3,692,529 A * | 9/1972 | Rychman | 99/2 |
| 3,697,245 A | 10/1972 | Dilday | 71/28 |
| 3,725,029 A | 4/1973 | Blackmore et al. | 71/28 |
| 3,730,692 A | 5/1973 | Holowaty et al. | 44/6 |
| 3,734,707 A | 5/1973 | Seymour | 71/30 |
| 3,740,346 A * | 6/1973 | Roncheur | 252/384 |
| 3,885,946 A | 5/1975 | Seymour | 71/30 |
| 4,169,170 A | 9/1979 | Doeksen | 427/155 |
| 4,207,186 A | 6/1980 | Wang et al. | 210/54 |
| 4,389,218 A | 6/1983 | Pike | 44/6 |
| 4,425,252 A | 1/1984 | Cargle et al. | 252/88 |
| 4,587,358 A | 5/1986 | Blouin | 71/28 |
| 4,689,251 A * | 8/1987 | Newman et al. | 427/220 |
| 4,704,230 A | 11/1987 | Blackmore | 252/502 |
| 4,722,740 A | 2/1988 | Donnelly | 44/51 |
| 4,846,871 A | 7/1989 | Detroit | 71/25 |
| 5,041,153 A | 8/1991 | Detroit | 71/25 |
| 5,238,480 A | 8/1993 | Rehberg et al. | 71/28 |
| 5,383,952 A * | 1/1995 | Singewald et al. | 71/63 |
| 5,968,222 A | 10/1999 | Kodali | 71/64.07 |

FOREIGN PATENT DOCUMENTS

| | | | |
|---|---|---|---|
| JP | 65007098 | * | 4/1963 |
| JP | 50-40491 | | 5/1975 |
| JP | 53-85819 | | 7/1978 |
| JP | 55-175511 | | 6/1982 |
| RU | 2019535 | * | 9/1994 |
| SU | 1685969 | * | 1/1991 |

* cited by examiner

*Primary Examiner*—Chhaya D. Sayala
(74) *Attorney, Agent, or Firm*—Banner & Witcoff, Ltd.

(57) ABSTRACT

Applying a polyhydric alcohol anti-dust agent, such as glycerol, to inorganic particulate materials reduces the formation of dust during processing and handling. The anti-dust agent is particularly effective for reducing dust formation in fertilizers such as disintegrating sulfur fertilizer (DSF), without interfering with the useful disintegration or other useful properties of the fertilizer.

2 Claims, No Drawings

POLYHYDRIC ALCOHOL ANTI-DUST AGENT FOR INORGANIC MATERIALS

BACKGROUND OF INVENTION

1. Field of the Invention

The present invention is directed to anti-dust agents for inorganic particulate materials and, more particularly, to anti-dust agents for fertilizers.

2. Description of Related Art

Inorganic particulate materials and, more particularly, fertilizers, such as disintegrating sulfur fertilizer (DSF), ammonium phosphates, calcium phosphates, ammonium nitrates, potassium nitrates, potassium chlorides, potassium sulfates, and the like are widely used. Methods of manufacturing these inorganic materials, as well as methods of processing the materials into particles via prill and granulation techniques, are also known. The inorganic particulate materials, however, often exhibit an undesirable level of dust formation. During handling or transportation, the inorganic particulate materials can break into smaller particles, resulting in unacceptable levels of dust.

Dust emission from inorganic particulate materials, such as DSF, can present ecological concerns and can be quite irritating to persons upon short-term exposure. In some cases, dust emissions from inorganic particulate materials can even form explosive mixtures with air. As used herein, dust refers to airborne particles, the majority of which are about 10 microns or smaller, created during the production and handling of fertilizers and other inorganic particulate materials.

Because of difficulties associated with manufacturing useable particulate fertilizer that does not emit unacceptable levels of dust, special anti-dust treatments often have been applied. Generally, anti-dust treatments for inorganic particulate materials, such as fertilizers, have focused primarily on petroleum-based products, mineral oils, and waxes. Each of these treatments presents disadvantages. For example, oils tend to volatilize and/or soak into the fertilizer with time and lose their effectiveness, while waxes and petroleum-based products are difficult to handle, and can require special heated application equipment. Inorganic particulate materials coated with petroleum-based products can generate residues on handling equipment, and, in the case of coated fertilizers, typically result in the separation of scum upon dissolution of the fertilizer in water.

One example of a petroleum distillate residue used as an anti-dust agent for phosphate and other fertilizers is Dustrol 3079™ or Arr-Maz 3670™ Petroleum-based materials of this type have a relatively high viscosity and must either be heated or diluted with a volatile solvent in order to be coated onto particles. Petroleum distillate residue material produces a sludge that can clog filters during spray application. The petroleum distillate residue material also can adversely affect the color of the fertilizer. For example, Dustrol 3079™ turns DSF particles black, particularly when the residue material is recycled.

There remains a need for a more efficient and cost effective anti-dust agent for inorganic particulate materials, and especially for fertilizers such as DSF. It would be particularly desirable to develop an anti-dust agent for DSF that does not interfere with the useful disintegration of the fertilizer and that is environmentally safe.

SUMMARY OF THE INVENTION

According to one aspect of the invention, a process of reducing the formation of dust in an inorganic particulate material comprises applying to the inorganic particulate material an effective amount of an anti-dust agent. The anti-dust agent comprises at least one polyhydric alcohol represented by the formula $C_nH_{(2n+2)}O_m$ wherein $3 \leq n \leq 6$ and m=n or n−1, with the proviso that $m \geq 3$. A preferred polyhydric alcohol is glycerol. The process is particularly effective for reducing dust formation in fertilizers, including time-release fertilizers such as disintegrating sulfur fertilizer (DSF).

According to another aspect of the invention, an inorganic particulate material having reduced dust emissions comprises inorganic particles coated with an effective amount of an anti-dust agent. The anti-dust agent comprises at least one polyhydric alcohol.

The polyhydric alcohols of the present invention are efficient and cost effective agents for reducing dust formation in inorganic particulate materials, overcoming the drawbacks of previous oil- petroleum-, and wax-based anti-dust agents. The polyhydric alcohols of the present invention also are environmentally safe. Advantageously, when used with fertilizers such as DSF, the polyhydric alcohols do not interfere with useful disintegration of the fertilizer or otherwise adversely affect its useful properties and characteristics.

DETAILED DESCRIPTION

The invention will be described primarily with reference to anti-dust treatments for fertilizers, particularly disintegrating sulfur fertilizer (DSF). It is to be understood that anti-dust treatments for other fertilizers, as well as for other inorganic particulate materials, are within the scope of the present invention. Non-limiting examples of other types of fertilizers include ammonium phosphates, calcium phosphates, ammonium nitrates, potassium nitrates, potassium chlorides, potassium sulfates, and the like. Non-limiting examples of other inorganic particulate materials include minerals, fillers, and the like.

The terms "particle," "particles," "particulate" and similar terms are used herein to broadly embrace materials having a wide variety of particle sizes and shapes. As will be apparent to persons skilled in the art, particle sizes and shapes will depend on such factors as the particular type of inorganic material as well as the particular processing technique used (prill, granulation, etc.). For example, in many granular fertilizers a majority of particles typically has a mesh size of about 4 to 20, and a minority of fines often has a mesh size of about 50 to 75. The terms "particle," "particles," and "particulate" are particularly inclusive of DSF prills (sometimes also referred to as "pels"), which typically are processed by dropping molten DSF onto a moving, cooled, stainless steel belt to form "split pea" shapes. A majority of the DSF prills usually has a diameter of from about 0.136" to about 0.154" and a height of from about 0.041" to about 0.059".

Many fertilizers exhibit time-release properties. For example, when put into soil, some DSF particles disintegrate immediately, e.g., within about 30 minutes, while other particles disintegrate after significantly longer periods of time, e.g., up to about one year, resulting in a useful time-release of sulfur and sulfates into the soil. When used with time-release fertilizers, such as DSF, the anti-dust agents preferably should not interfere with such disintegration of the fertilizer.

The anti-dust agent of the present invention comprises at least one polyhydric alcohol. Preferably, the anti-dust agent is completely water-soluble and does not require a surfactant. A preferred polyhydric alcohol is glycerol ($C_3H_8O_3$, also referred to as glycerin or glycerine). Examples of other polyhydric alcohols that can be used include, but are not limited to, erythritol ($C_4H_{10}O_4$); pentaerythritol, ($C_5H_{12}O_4$); and sorbitol, mannitol, and dulcitol (all $C_6H_{14}O_6$). Combinations of any two or more of the polyhydric alcohols also are useful. The polyhydric alcohols of the present invention are represented by the formula $C_nH_{(2n+2)}O_m$ wherein $3 \leq n \leq 6$ and m=n or n−1, with the proviso that $m \leq 3$. The polyhydric alcohol can be supplied in any suitable form. It is preferred that the polyhydric alcohol has minimal water content, as high water contents can promote premature disintegration of DSF. Preferably, the water content is less than about 10 wt %, more preferably less than about 5 wt %.

Glycerol is commercially available in pure or substantially pure form (CAS # 000056-81-5). Glycerol is hygroscopic and will absorb moisture from the air.

The anti-dust agent can be applied to the inorganic particulate material using any suitable technique, such as spraying. This can be carried out using either a batch or continuous processing mode, although a continuous process is preferred for the manufacture of large commercial scale quantities of inorganic particulate material. For example, the particulate material can be passed over conveyor belts while the anti-dust agent is applied via one or more pressurized nozzles.

The amount of anti-dust agent applied to the inorganic particulate material should be at least a minimum amount that provides some reduction in dust formation. There is no particular maximum amount of anti-dust agent contemplated; the practical limiting factor is cost. Of course, the anti-dust agent preferably should not be present in excessive concentrations that may adversely affect the desired physical and/or chemical properties of the inorganic particulate material.

The effective amount of the anti-dust agent also may depend on the handling and/or packaging of the inorganic particulate material. For example, lower amounts of the anti-dust agent may be effective for treatments of fertilizers packaged in bulk bags, e.g., 2000 or 2500 lb. bags, whereas somewhat larger concentrations may be required for fertilizers handled in bulk loads.

It has been found that when using glycerol as an anti-dust agent for DSF, a minimum dust reducing effective amount is about 0.2 wt % glycerol, based on the total weight of the coated DSF particles. Preferably, the concentration of glycerol is from about 0.2 wt % to about 2 wt %, more preferably from about 0.25 wt % to about 1 wt %. The latter range corresponds to applying about 0.5 to about 2 gallons of glycerol per ton of DSF. Glycerol has a relative density of 1.2611 kg/L at 20° C.

The inorganic particulate material can be prepared using any suitable technique. During manufacturing of disintegrating sulfur fertilizer (DSF), for example, molten sulfur fertilizer typically is dropped onto a moving, cooled, stainless steel belt to form small split pea shaped prills. The prills typically have a diameter of from about 0.136" to about 0.154" and a height of from about 0.041" to about 0.059'. It should be understood that the particular technique used to prepare the inorganic particulate material forms no part of the present invention.

The inorganic particulate material optionally can be blended with other materials, such as other fertilizer materials, either prior or subsequent to being treated with the polyhydric alcohol anti-dust agent. For example, DSF can be treated with glycerol and then mixed with one or more high-nitrogen fertilizers to prepare a blended fertilizer. In addition, conventional fertilizer additives optionally can be added, for example hydrophilic components such as bentonite clay.

The efficacy of the anti-dust treatments can be determined simply by visually observing the coated inorganic particulate materials during routine handling or transportation. Alternatively, methods for quantitatively measuring dust liberation from inorganic particulate materials are described, for example, in U.S. Pat. No. 5,968,222.

EXAMPLES

The following examples are provided for illustrative purposes only and should not be construed as limiting the present invention. The examples illustrate treating disintegrating sulfur fertilizer (DFS) with glycerol (CAS # 000056-81-5) as an anti-dust agent. Glycerol was applied to DSF particles with spray nozzles as the particles were transported on a conveyor. The application rates used are indicated in the enumerated examples below.

Disintegration of the DSF was determined using the following procedure with the aid of a clean, dry, #30 mesh stainless steel sieve; a large, clean, dry plastic funnel; large folded fluted filter paper; an electronic balance capable of weighing to within 0.0001 g; a drying oven at 105° F.; a general balance capable of weighing 200 g to within 0.1 g; several 500 ml. plastic beakers; an empty 39 oz. coffee can to hold the funnel; a sink with a hose containing running cold (approx. 50° F.) water; and a fine tip permanent marker.

Using the general balance, a 500 ml. plastic beaker was weighed, and 100 g of disintegrating sulfur pels were placed in the beaker. The beaker was filled with cold flowing tap water to 400 ml. The contents were stirred gently and allowed to stand uncovered for 24 hours. Several pieces of folded fluted filter paper were marked and weighed on the electronic scale.

After 24 hours, the #30 sieve was placed on top of the open end of the 39 oz. coffee can, and the contents of the 500 ml. plastic beaker were poured into the sieve. The hose was used to rinse all of the contents of the beaker into the sieve. Immediately thereafter, the sieve was rinsed with the cold running tap water to wash the yellow sulfur fines through the sieve. The remaining sulfur was then washed into one small pile in one quadrant edge of the #30 sieve.

The #30 sieve then was removed from the coffee can, and the coffee can was rinsed until no visible sulfur remained. With the large plastic funnel placed in the coffee can, the weighed fluted filter paper was opened and placed into the funnel. The sulfur remaining on the #30 sieve was carefully washed onto the filter paper, using as little water as possible. The sieve then was rinsed with water from the hose to wash any remaining sulfur onto the filter paper, and water was allowed to flow through the filter paper for several seconds.

The filter paper then was carefully removed from the funnel. After all visible water passed through the filter paper, the filter paper was placed in the beaker. The beaker containing the filter paper was placed into the 105° F. oven and allowed to dry overnight. Each filter paper was removed from the oven, cooled to room temperature, and weighed on the electronic balance. The original filter weight then was subtracted to determine the weight of the retained sulfur. The retained sulfur weight then was subtracted from 100 g to obtain the weight of the sulfur that passed through the #30 sieve, and expressed as weight percent disintegrated.

Examples 1–6

Glycerol was applied as an anti-dust agent to DSF particles for packaging in 2000 lbs. bulk bags. All of the samples were at least two weeks old. Table 1 summarizes the percent disintegration (weight percent passed through #30 sieve) for DSF particles coated at a variety of rates ranging from about 0.4 to 1.2 gallon per ton (gpt). Each sample also was analyzed for disintegration prior to application of glycerol for purposes of comparison.

No appreciable dust formation was observed in any of the glycerol-treated samples during routine handling of the DSF particles. Visible dust formation was observed, however, during routine handling of the untreated DSF particles. As illustrated in Table 1, glycerol had no adverse impact on disintegration of the DSF. In fact, in many cases glycerol was shown to actually improve disintegration of the DSF particles. [t1]

TABLE 1

Disintegration of Glycerol-Treated and Untreated DSF Particles

| Example | Glycerol (gpt) | Filter Paper (g) | Filter Paper + Retained S (g) | Passed Thru #30 Sieve (wt %) |
|---|---|---|---|---|
| 1 | 1.2075 | 8.2604 | 47.3420 | 60.92 |
| Comp. 1 | 0 | 8.1162 | 56.2701 | 51.85 |
| 2 | 1.2075 | 8.0046 | 40.9564 | 67.05 |
| Comp. 2 | 0 | 8.2230 | 45.9647 | 62.26 |
| 3 | 0.8050 | 7.9107 | 80.9660 | 26.94 |
| 3A | 0.8050 | 8.1338 | 69.4000 | 38.73 |
| Comp. 3 | 0 | 8.2004 | 78.2180 | 29.98 |
| 4 | 0.4025 | 8.2582 | 42.8216 | 65.44 |
| Comp. 4 | 0 | 8.0890 | 42.3462 | 65.74 |
| 5 | 0.4025 | 8.3682 | 51.6524 | 56.72 |
| 5A | 0.8050 | 8.0306 | 53.8239 | 54.21 |
| Comp. 5 | 0 | 8.1357 | 47.9164 | 60.22 |
| 6 | 0.4025 | 8.1456 | 64.6120 | 43.53 |
| 6A | 1.2075 | 7.9765 | 51.0784 | 56.90 |
| Comp. 6 | 0 | 7.9983 | 65.0780 | 42.92 |

Example 7

This example illustrates treating bulk loads of disintegrating sulfur fertilizer (DFS) with glycerol as an anti-dust agent. DSF particles were transported on a conveyor past spray nozzles applying glycerol at a concentration of 1.2 gallons per ton of DSF (about 0.6 wt %). The coated particles were stored in bins and later handled using a backhoe. No appreciable dust formation was observed. The anti-dust agent had no adverse impact on disintegration of the DSF.

Example 8

Glycerol was applied to bulk loads of DSF as in Example 7 except that the amount of glycerol was reduced, to 0.6 gallons per ton of DSF (about 0.3 wt %). Glycerol was found to be an effective anti-dust agent and did not interfere with disintegration.

While particular embodiments of the present invention have been described and illustrated, it should be understood that the invention is not limited thereto since modifications may be made by persons skilled in the art. The present application contemplates any and all modifications that fall within the spirit and scope of the underlying invention disclosed and claimed herein.

What is claimed is:

1. A process of reducing the formation of dust in disintegrating sulfur fertilizer (DSF) comprising applying glycerol to DSF particles in a concentration of from about 0.25 wt % to about 1 wt % based on the total weight of the coated DSF particles.

2. Disintegrating sulfur fertilizer (DSF) having reduced dust emissions comprising DSF particles coated with glycerol in a concentration of from about 0.25 wt % to about 1 wt % based on the total weight of the coated DSF particles.

* * * * *